March 13, 1956  A. D. SIMPSON  2,737,858
VERTICAL CHAMBER POSITIVE PRESSURE MACHINE FOR
FORMING CONTINUOUS STRIPS OF FIBROUS MATERIALS
Filed April 27, 1954  6 Sheets-Sheet 2

Inventor:
Alvan D. Simpson
BY Harry B. Cook,
Attorney.

March 13, 1956　　　A. D. SIMPSON　　　2,737,858
VERTICAL CHAMBER POSITIVE PRESSURE MACHINE FOR
FORMING CONTINUOUS STRIPS OF FIBROUS MATERIALS
Filed April 27, 1954　　　　　　　　　　　　6 Sheets-Sheet 3

Inventor:
Alvan D. Simpson
Harry A. Cook,
BY
Attorney.

March 13, 1956 A. D. SIMPSON 2,737,858
VERTICAL CHAMBER POSITIVE PRESSURE MACHINE FOR
FORMING CONTINUOUS STRIPS OF FIBROUS MATERIALS
Filed April 27, 1954 6 Sheets-Sheet 4

Inventor:
Alvan D. Simpson
BY Harry B. Cook,
Attorney.

United States Patent Office
2,737,858
Patented Mar. 13, 1956

2,737,858

VERTICAL CHAMBER POSITIVE PRESSURE MACHINE FOR FORMING CONTINUOUS STRIPS OF FIBROUS MATERIALS

Alvan D. Simpson, Plainfield, N. J., assignor to The Forming Machine Company of America, Inc., Bound Brook, N. J., a corporation of Delaware Application April 27, 1954, Serial No. 425,838

12 Claims. (Cl. 92—39)

This application is a continuation-in-part of my copending application Serial No. 264,035 filed December 29, 1951, and the invention relates in general to the manufacture of continuous strips of compositions of matter including fibers, for example, mixtures of asbestos and cement, wood pulp and a plastic composition, glass fibers or filaments and vinyl compounds, or similar materials.

A machine for forming such continuous strips is claimed in the above-mentioned application and in my Patent No. 2,581,210 dated January 1, 1952, said machine including a screen comprising a hollow cylinder having a perforate circumferential wall or screen mounted to rotate on a horizontal axis in a tank with its lower portion submerged in a wet mix of solids and liquid and with the upper portion of the cylinder disposed in a chamber in the tank above the mix into which chamber the gas under pressure is admitted, said chamber being closed except for an opening in the wall thereof above the mix and the upper portion of said cylinder extending across said opening, so that a deposit of solids from the mix is first forced in a layer onto the portion of the cylinder that is in the mix, while the liquid from the mix passes into said cylinder; and then the layer is moved by rotation of the cylinder into said chamber where the liquid is forced from the layer by the gas pressure to dry the layer, after which the layer is peeled from said cylinder and ejected through said opening in the tank wall.

A prime object of the present invention is to provide a machine based on the broad principles above described but which shall embody a novel and improved construction and combination of a tank for the mix, and a screen the area of the portion of which to receive the deposit may be many times greater than the practical area of a hollow cylinder and practically unlimited, and whereby a deposited layer can be formed of uniform thickness, of uniform composition throughout its thickness, and with substantially equal strength lengthwise and crosswise of the strip.

Other objects of the invention are to provide a machine of the character described wherein a layer of material shall be deposited on a foraminous wall or screen in one chamber and said wall or screen with said layer thereon can then be conveyed in succession to a plurality of other chambers whereby the layer can be subjected to different gas pressures or whereby a plurality of additional layers can be deposited and subjected to gas pressure in any desired sequence of operations; and to provide a machine wherein a flat approximately horizontal screen shall have the layer of material deposited thereon in one chamber and shall then convey said layer through one or more other chambers or machines where gas pressures or other layers may be applied to the deposited layer or other operations may be performed on the layer or layers without disturbing the position of the layers on the screen.

A further object of the invention is to provide in a machine of this character novel and improved means to rapidly form the layer and rapidly and thoroughly dry the layer and at the same time protect the layer against injury during the forming and the handling thereof.

A still further object is to provide such a machine which shall be of simple and inexpensive construction, operation, maintenance and repair.

Other objects, advantages, and results of the invention will be brought out by the following description in conjunction with the accompanying drawings in which.

Specifically describing the embodiment of the invention illustrated in Figures 1–6 inclusive, 10, 19 and 20, the machine is shown schematically and comprises a frame A at each end of which is journaled a shaft B on each of which are two sprockets 1 and 2 having radial arms 3 that have notches in their outer ends to engage combined pivot and tie rods 4, each of which pivotally connects together two sections 5 of an endless conveyor which carries the foraminous, perforate or reticulate wall as will be hereinafter described. The sections 5 are of such a width that the longitudinal edges of adjacent sections which extend transversely of the conveyor abut each other so as to form substantially a continuous horizontal upper surface on the upper reach of the conveyor. The sections 5 extend transversely horizontally of the frame and have shoes 6 at their ends to slidably engage horizontal rails or tracks 7 for supporting the upper reach of the conveyor in a horizontal plane. The sections in the lower reach of the conveyor are similarly supported by guide rails 8. The conveyor may be driven from any suitable source of power, for example, from a belt and pulley connection 9.

Mounted on the frame above the upper horizontal reach of the conveyor, as by bracket arms 10, is a tank C for a mixture 11 of solids, such as wood pulp, asbestos fibres, or cement suspended in a liquid, the lower end of the tank opening onto the top surface of the upper reach of the conveyor and being sealed against escape of liquid except through the conveyor sections 5 that have perforate or foraminous portions 12 intermediate their ends and extending to said longitudinal edges of the sections as best shown in Figures 2–6 inclusive. As shown, the foraminous portions 12 rest on the narrow edges 13 of supporting slats 14 that are in turn supported by bars 15 which are carried by the main beams 16 that extend transversely of the sections and have their ends connected to side bars 17 that are provided with perforate ears 18 through which the pivot and tie rods 4 extend.

Figure 1:
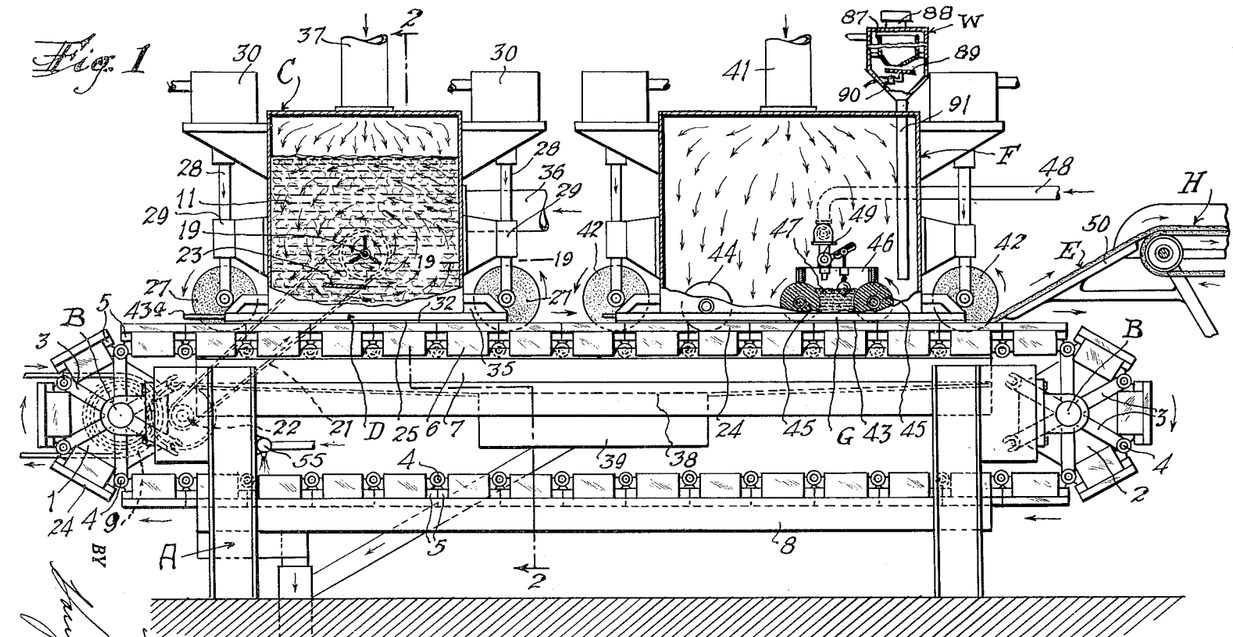
Figure 1 is a side elevational view of a machine embodying the invention, with portions broken away and shown in section.

The mixture 11 is perferably continually stirred by an agitator 19 which also causes circulation of the mix as indicated by the arrows so that the mix at the zone of contact with the foraminous wall will tend to move in the same direction as said wall, i. e. to the right in Figure 1. The agitator may be driven in any suitable manner as by a belt and pulley connection 21 between the shaft of the agitator and a countershaft 22 that has a driving connection, for example by a gear train with the sprocket shaft which is driven by the belt and pulley connection 9. Preferably a baffle 23 is disposed in the tank beneath the agitator to shield the deposited layer on the foraminous wall from the direct action or currents from the agitator.

Figure 19:
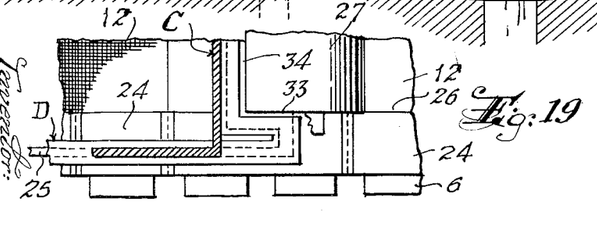
Figure 19 is an enlarged fragmentary horizontal sectional view approximately on the plane of the line 19—19 of Figure 1 with portions omitted for clearness of illustration.
Figure 20:
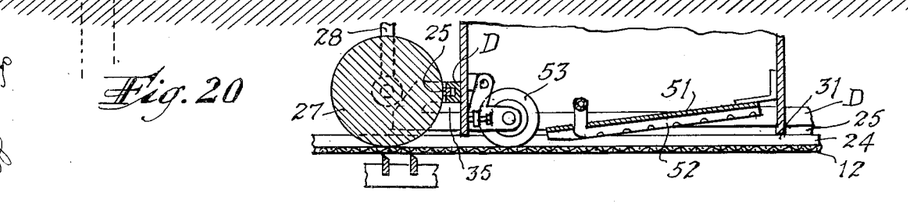
Figure 20 is a fragmentary vertical longitudinal sectional view approximately on the plane of the line 20—20 of Figure 2 with portions of the screen supporting conveyor omitted.

Any suitable means may be utilized for preventing leakage of the liquid between the walls of the tank and the upper reach of the conveyor, but as shown, such means comprises an upstanding projection on and extending along each longitudinal margin of the foraminous wall. More particularly, said upstanding projection comprises blocks 24 on the conveyor sections which, when the sections are in the upper reach of the conveyor, abut each other and form a smooth upper bearing surface for a resilient sealing element 25 which may be of the same general construction as the sealing strip of my copending application Serial No. 217,906. The blocks also form smooth vertical shoulders 26 facing into the tank and abutted with a fluid-tight contact by the ends of rollers 27 which may be mounted on the frame and tank in any suitable manner which for the purpose of illustration is shown as comprising guide frames 28 that are mounted in brackets 29 and are forced toward the upper reach of the conveyor by the fluid-pressure motors 30. The lower edges of the end walls of the tank are spaced from the foraminous wall to provide passages 31 (Figure 20) for the mix and these passages are sealed in any suitable manner. As shown, the resilient sealing strip 25 is mounted in a channel-shaped holder D that is secured to the walls of the tank with one part of the strip engaging the blocks 24 as indicated at 32, another portion of the strip engaging the end surface of the rollers 27 as indicated at 33, and other portions engaging the peripheries of the rollers as indicated at 34 (Figure 19). The spaces between the holder D and the tank wall may be closed by plates 35.

Figures 12, 13, 14:
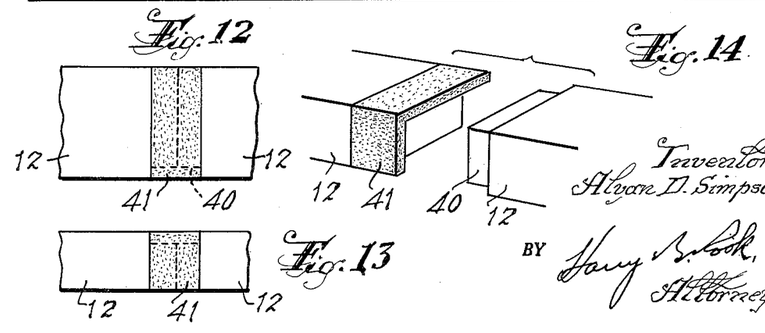
Figure 12 is a detail fragmentary plan view of the sealed joint between the screen conveyor sections.
Figure 13 is a side elevational view of said sealed joint.
Figure 14 is a composite fragmentary perspective view of portions of two conveyor sections at said sealed joint.

The joints between the abutting ends of the blocks 24 are preferably sealed, for example as shown in Figures 12–14 inclusive where the adjoining ends of adjacent blocks are rabbetted as indicated at 40 and a suitable resilient sealing strip 41 is fastened in one of said rabbets to seat in the other rabbet when the blocks abut each other as shown in Figures 12 and 13.

The mixture 11 may be forced into the tank through a supply pipe 36, and in accordance with the invention, gas under high pressure, substantially above atmospheric pressure, for example from 10 to 100 pounds per square inch, is admitted into the space or chamber of the tank above the surface of the mix, through a pipe 37.

With this construction the gas pressure forces the liquid through the foraminous portions 12 and causes the deposit of the solid particles from the mix in the form of a layer E on the conveyor, the liquid being forced from the mix through said foraminous portions the under sides of which are exposed to the atmosphere. The liquid that flows through said foraminous portions may be disposed of in any suitable manner, for example as by a catchpan 38 from which the liquid may be conducted by a trough 39 to any suitable point.

The conveyor then moves the deposited layer from beneath the tank C under and across the lower end of a pressure chamber F where the deposited layer is subjected to high gas pressure that is supplied to the chamber within the tank through a pipe 41. The lower end of the tank opens onto the conveyor in exactly the same way that the lower end of the tank C opens onto the conveyor and may be sealed in the same way with rollers 42 that are identical with the rollers 27 and cooperate with a sealing element 43 in a holder G identical with the sealing element 25 and the holder D.

Figures 7, 10:
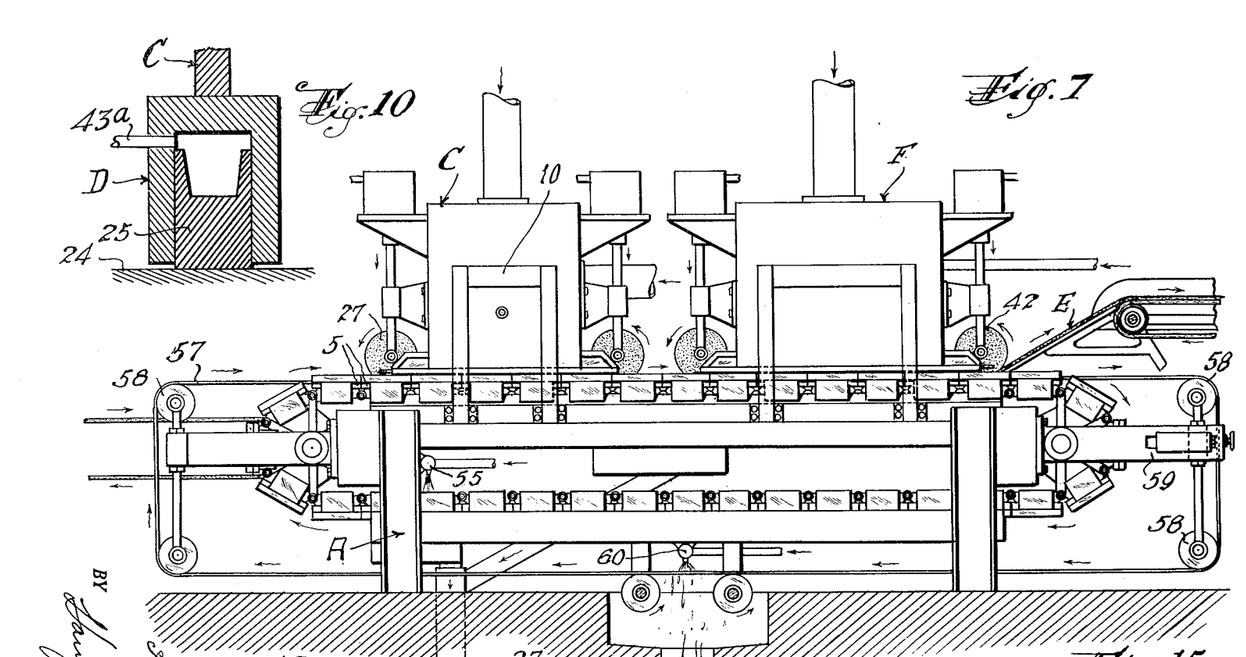
Figure 7 is a side elevational view of a modified form of the machine.
Figure 10 is an enlarged fragmentary transverse vertical sectional view through a portion of the devices for sealing the zones of juncture of the vertical tanks and the screen conveyor.

In the sealing means for both tanks, preferably air under pressure is admitted into the holders D and G behind the resilient sealing elements 25 and 43, respectively, as by pipes 43a best shown in Figure 10 of the drawings.

It may be desirable to arrange in the pressure tank at least one roller 44 that may be mounted in any suitable manner to yieldingly and rollably press the deposited layer E and facilitate squeezing of the liquid from the layer and at the same time smoothing of the layer. Also, means for applying a layer of veneer or other suitable material upon the deposited layer may be located in the pressure tank. This means is shown as comprising two rolls 45 journaled between end walls 46 and adapted to engage the upper surface of the deposited layer, the rolls and said end walls having properly sealed joints and containing between them a supply of the veneer or other material 47 to be applied to the deposited layer. Said veneer material may be supplied through a pipe 48 having a float controlled valve 49.

The deposited layer is moved by the conveyor from beneath the pressure tank and may be conducted to any desired point by any suitable means such as a stripping plate 50 and a conveyor H.

It will be observed that during the operation of the machine, gravitational action will tend to cause the solid particles to move toward the foraminous wall and there will be a minimum of friction between the foraminous wall and the mix because the mix may rotate in currents through almost a circle with the mix at its zone of contact with the foraminous wall freely movable in the direction of travel of said wall. This also reduces to the minimum any grain effect in the deposited layer. The movement of the mix and the pressure of the mix against the foraminous wall is uniform throughout the width of the deposited layer. The machine thus ensures the production of a deposited layer having a constant or uniform mix composition throughout its thickness and also having substantially equal strength in lengthwise and crosswise directions and a minimum of thickness variation.

Moreover, the machine ensures thorough and rapid drying of the deposited layer and the conveyor moves the deposited layer from the forming tank C to and from the pressure tank F with no disturbance of the layer on the foraminous wall. Furthermore, the waste liquid from both the forming tank and the pressure tank is easily and quickly disposed of without the use of pumps or other complicated apparatus and without any contact with the deposited layer after the waste water has once passed through said layer.

In some cases it is desired to form the deposited layer with an offset or some uneven thickness and this may be easily effected by the use of one or more channels 51 (Figures 2 and 20) disposed to partially overlie the deposited layer as the layer is formed, and means such as perforated pipes 52 for injecting water into the channels so that such water will reduce the amount of mix at the zones of the foraminous wall juxtaposed to the channels. The cross-sectional shape and dimensions of the channels may be varied to change the shape or thickness of the deposited layer, the water within the channels in each case preventing the layer from building up in zones with which the water in the channels contacts.

Another manner of varying the cross-sectional shape or thickness of the deposited layer comprises a roll 53 of the desired shape to press against the layer while it is being formed and thereby compress the layer and in so doing partly close up the interstices or pores of the layer, which in turn will make the layer less pervious so as to reduce the rate at which the layer will increase in thickness along the pressed zone. The degree of pressure exerted by such rolls may be varied by using rolls of different diameters or by adjusting the rolls toward or away from the foraminous wall.

Figure 2:
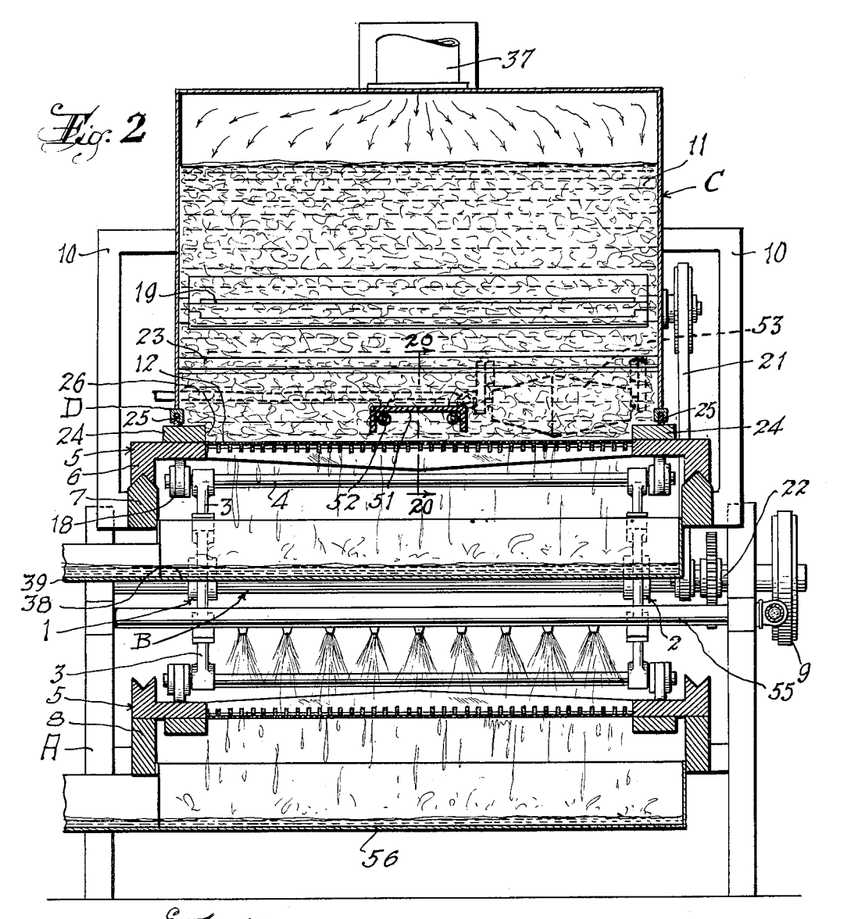
Figure 2 is an enlarged transverse vertical sectional view approximately on the plane of the line 2—2 of Figure 1.
Figure 3:
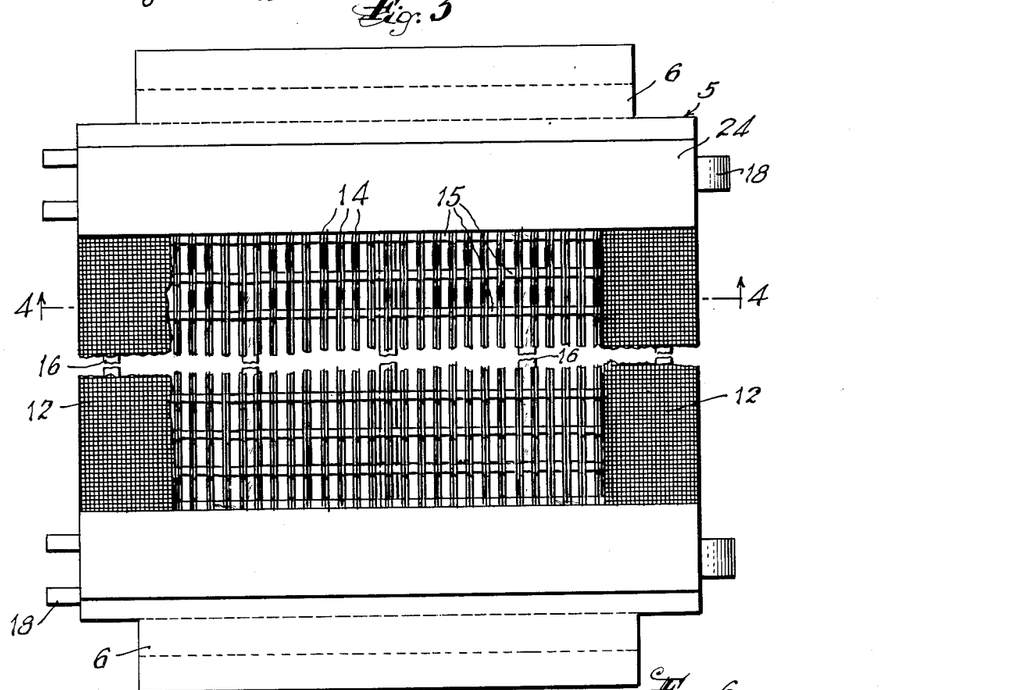
Figure 3 is an enlarged top plan view of one of the sections of screen conveyor.
Figure 4:
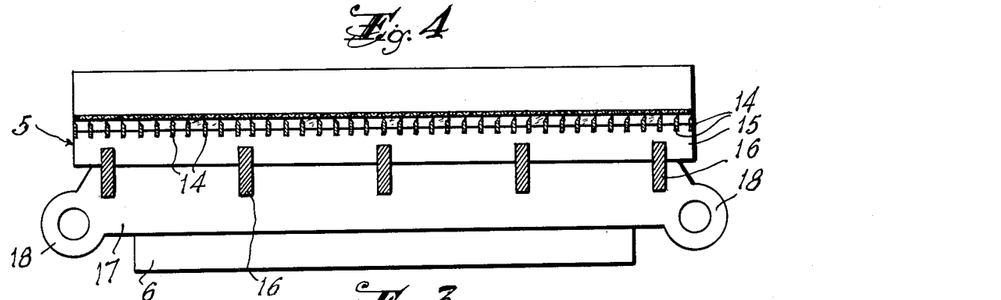
Figure 4 is a longitudinal vertical sectional view on the plane of the line 4—4 of Figure 3.
Figure 5:
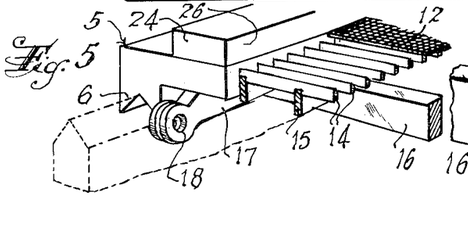
Figure 5 is a fragmentary sectional perspective view of one corner portion of said screen conveyor section.
Figure 6:
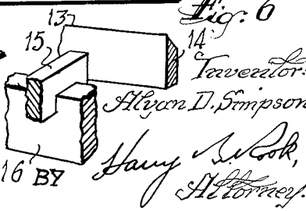
Figure 6 is a fragmentary sectional perspective view of another portion of said section of the screen conveyor.

As shown in Figures 1 and 2, spray pipes 55 may be provided above the lower reach of the conveyor to apply jets or sprays of liquid to the under side of the foraminous wall and thus wash solid particles out of the interstices of the foraminous wall, the wash water being caught and carried away by a catchpan 56.

Instead of forming the foraminous wall in sections, each of which is carried by one of the sections 5 of the conveyor, it is possible to utilize an endless wire screen belt 57 as shown in Figure 7, said belt being mounted on support rollers 58 that are carried by bracket arms 59 on the main frame A of the machine. The upper reach of the screen belt forms the foraminous wall and overlies the support slats 14 and has the advantage of overlying the joints between the conveyor sections. The screen belt can be easily cleaned by passing the lower reach beneath the lower reach of the conveyor under a spray pipe 60. Moreover, the screen belt can be much more easily replaced than can the separate screen or foraminous wall sections 12. Furthermore, the screen belt can be made as long as desired so that it could be utilized to transport the deposited layer through other apparatus such as impregnating tanks, dyeing vats, drying ovens, etc.

Figure 8:
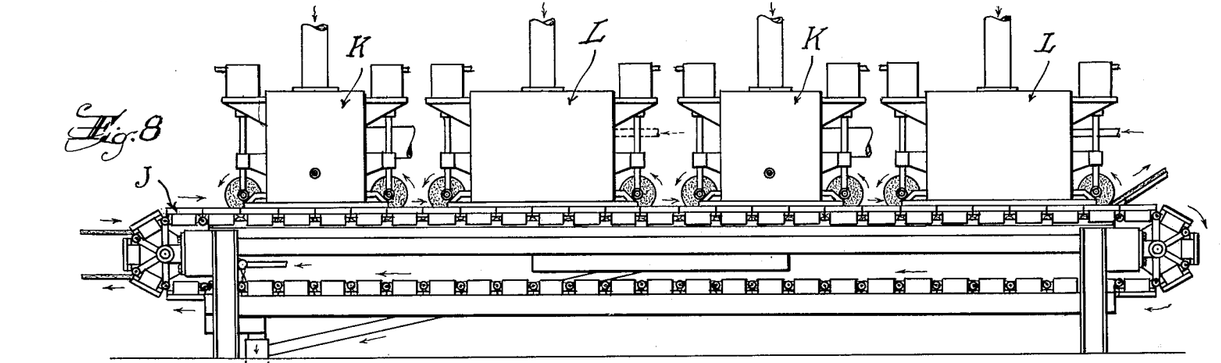
Figure 8 is a similar view of another modification of the invention.

Figure 8 illustrates a modification of the machine wherein the conveyor J is of the same construction as that hereinbefore described but is longer, and there are forming tanks K and pressure or drying tanks L arranged in alternate relation longitudinally of the conveyor so that one layer of mix may be deposited, after which said layer may be dried and then another layer of possibly another mix may be deposited on the first layer, and then the assembly can be dried and so on.

Figures 9, 11:
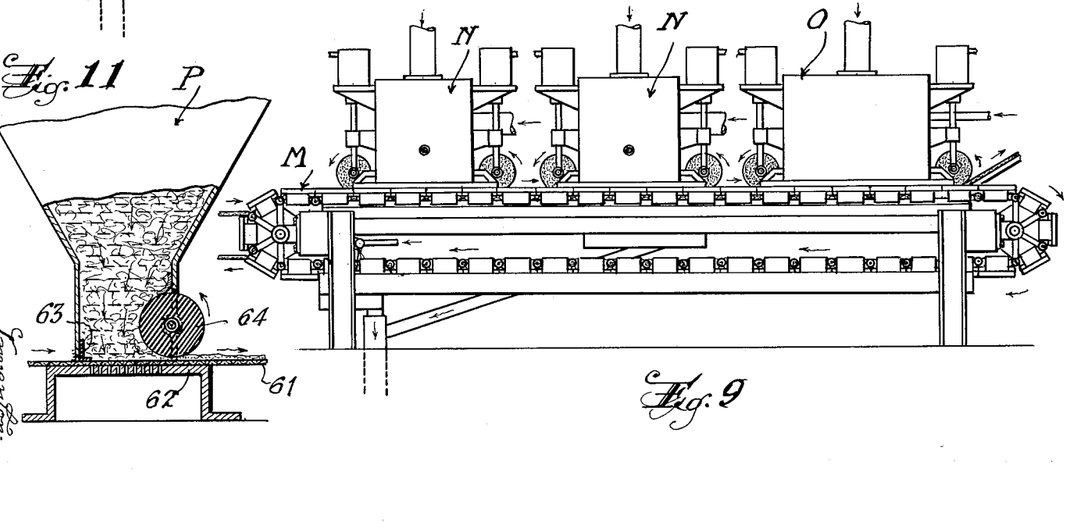
Figure 9 is a like view of still another type of machine embodying the invention.
Figure 11 is a transverse vertical sectional view of another type of machine embodying the invention.

If desired, a plurality of layers of mix may be deposited in superposed relation and then dried as by a machine such as shown in Figure 9 wherein the conveyor M is the same as the conveyors heretofore described and there are two forming tanks N and one pressure or drying tank O.

When forming thin deposited layers of film-like nature, it may be necessary to run the foraminous walls or screens at high speeds and to make the dimension of the opening in the mix tank in the direction of travel of the screen very small so that the opening is narrow, possibly an inch or so in width, but is of a length corresponding to the width of the foraminous wall. Such a machine is shown in Figure 11 where the forming tank P has a narrow opening at its bottom beneath which the screen or foraminous wall 61 is movable, the screen being supported on a perforate bed plate 62 and the opening at the sides thereof at which the screen enters and leaves being sealed by a resilient sealing strip 63 and a roll 64, respectively.

Inasmuch as the screen 61 may have to travel at a rate of, for example, 2500 lineal feet per minute, it is necessary to reduce the friction between the screen and its support to the minimum. For this purpose I may utilize a perforate drum Q of large diameter having a peripheral screen 65 movable beneath the narrow outlet opening 66 of a forming tank 67, and a perforate belt 68 may be passed over a portion of the periphery of the drum beneath said opening 66 to receive the deposited layer. This belt may have the same general function as the screen belt 57 of Figure 7 and can be used to transport the deposited layer R from the forming tank 67 beneath the bottom opening 69 of a pressure tank 70. The screen 65 on the drum may be of relatively large mesh, while the screen belt 68 ordinarily will be of fine mesh, so that the screen belt 68 will effectively support the layer and the waste water can easily and quickly flow from the layer through the wall of the drum. Gas pressure is applied above the mix in the tank 67 and to the pressure tank 70 to provide forming and drying operations and results similar to those hereinbefore described.

It is often necessary to produce a continuous strip having a foundation or base layer of one type of material and a surface or finish layer of another material; for example box board is made with a base layer of waste paper and a top layer of high grade sulphite pulp which is frequently printed. Asbestos shingle strips generally have a base including regular Portland cement and a veneer layer formed of white cement.

Figure 17:
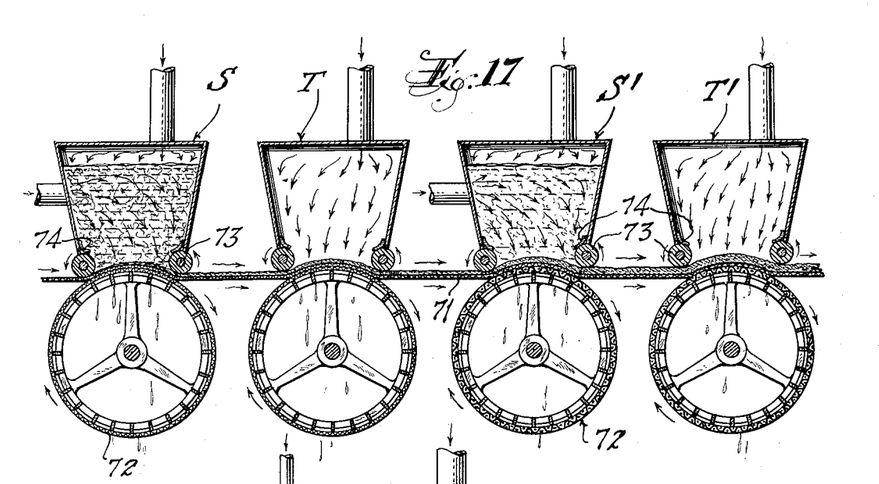
Figure 17 is a like view of a further modification of the machine which also includes means for forming a strip having two layers of different materials.

For this purpose I may utilize a machine including a plurality of forming and drying chambers arranged in a series as shown in Figure 17 where there are a plurality of forming tanks S, S' disposed in alternate relation to pressure or drying tanks T, T' longitudinally of a screen conveyor belt 71 that passes over and is supported by perforate drums 72, one of which is provided beneath the bottom opening of each of the tanks S, S' and T, T'.

Figures 16, 18:
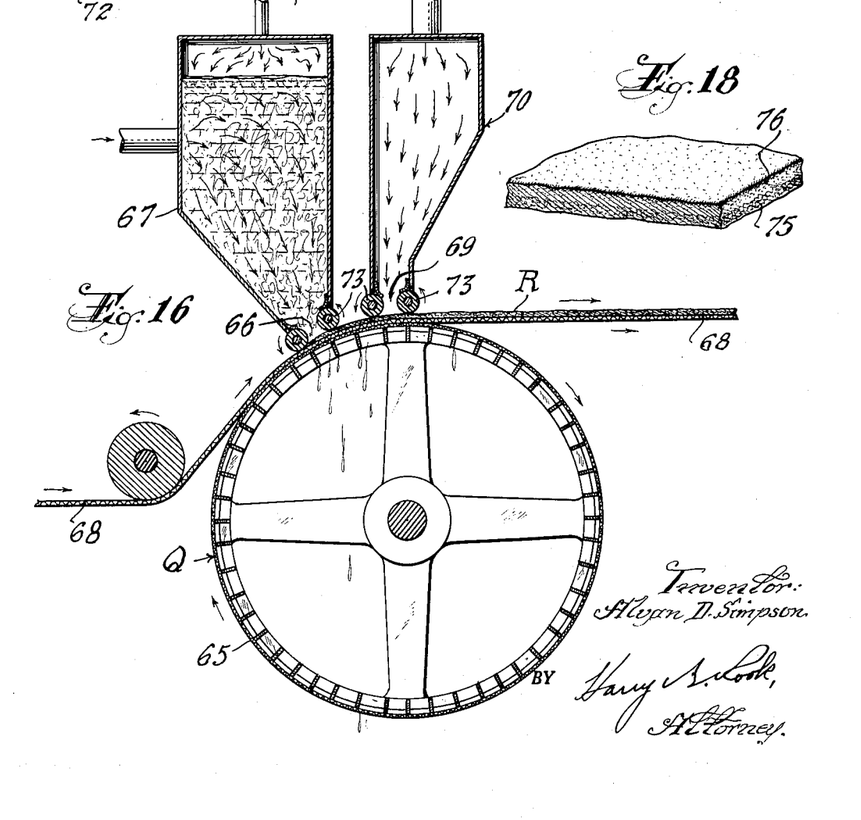
Figure 16 is a similar view of another modification of the machine.
Figure 18 is an enlarged fragmentary sectional perspective view of the strip formed by the machine of Figure 17.

In both forms of the invention shown in Figures 16 and 17, the bottom opening of the respective tanks have the same relation to the screen belts 68 and 71 as the bottom openings of the tanks C and F have to the foraminous walls of the machines shown in Figures 1 and 7; and while the same sealing means as shown in Figures 1 and 2 may be utilized, for simplicity and illustration in Figures 16 and 17, the sealing means is illustrated as comprising rollers 73 to contact with the deposited layer and flexible sealing strips 74 to seal the spaces between the rollers and the walls of the tanks.

Figure 18 illustrates fragmentarily a continuous strip that might be formed with the apparatus of Figure 17, the strip including a base layer 75 formed by the first forming tank S, and a top layer 76 deposited by the second forming tank S'. Obviously the first pressure tank T will dry the first layer 75 while the pressure tank T' will dry the top layer 76 and to some extent the bottom layer 75. Any desirable additional forming and drying tanks may be connected in the series, depending upon the operation and result desired.

Figure 15:
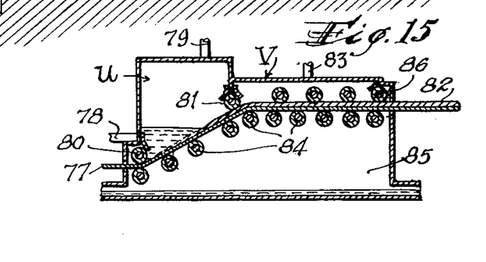
Figure 15 is a vertical longitudinal sectional view through another type of machine, embodying the invention.

Figure 15 shows another form of the invention wherein the foraminous wall or screen 77 is inclined upwardly across the bottom opening of the forming tank U so that the mix contacts with only the lower portion of the screen and the deposited layer on the upper portion of the screen in the tank is subjected to air pressure for partial drying. The screen is moved from the tank U through the pressure chamber V which corresponds to the pressure chamber F hereinbefore described.

The tank U has the mix supplied through a pipe 78, and gas under pressure is forced into the tank above the mix by a pipe 79 so as to force the liquid from the mix through the screen 77. A suitable sealing roll 80 is provided between the wall of the tank and the screen while another sealing roll 81 is disposed between the wall of the tank and the deposited layer 82 at a point between the tank U and the pressure chamber V. Gas under pressure is supplied to the pressure chamber through a pipe 83 and serves to force the liquid from the deposited layer 82. As shown, the screen is supported by rollers 84 and the liquid from the deposited layer drops between said rollers into a drainage chamber 85. Obviously, a suitable sealing means such as the roller 86 will be provided at the outlet end of the pressure chamber V, and sealing means will also be provided between the rollers 80, 81 and 86 and the walls of the tank and pressure chamber.

Sometimes it is desirable to deposit granular material on the surface of the deposited layer by gravitational action, for example as described in my copending application Serial No. 225,878; and Figure 1 illustrates schematically apparatus for accomplishing this result. This apparatus includes an air-tight housing W mounted on the top of the tank F with a hopper 87 therein for the granules, the housing having a filling pipe 88 through which the granular material may be supplied to the hopper. The granules are discharged or released from the hopper by a known type of vibratory base plate feeder 89 that is operated by a known type of electrical vibrator 90. The discharge end of the feeder plate is disposed above a feed chute 91 that leads from the housing to a point above the foraminous wall so that the granular material will be dropped by gravity from the feeder plate through the chute upon the surface of the deposited layer E. If desired, a presser roll could be provided to press the granules firmly into the deposited layer, and of course the roll 42 would at least partially effect such a result.

It wil be observed with reference to Figure 1 that the gas pressure will force the liquid from the pores of the deposited layer before the veneer or additional coating is applied so that said coating will freely flow into said pores and will be firmly forced into the pores by the gas pressure so as to become firmly bonded to the deposited layer. Similarly, the granules from the chute 91 are forced into the pores of the layer and additional rolls could be provided to press the layer and close up the pores around the granules.

The invention also contemplates subjecting the deposited layer to a plurality of treatment under different gases or different gas pressures. For example in Figure 8 the first tank could be a forming tank and other tanks could constitute pressure chambers, each containing a different gas or a gas under different pressure from the other tanks.

It will be understood that the structural details of the machine and the number of forming and pressure tanks may be varied, and that the conveyor may be utilized for transporting the deposited layer to other apparatus, all within the spirit and scope of the invention.

What I claim is:

1. A machine for forming a continuous strip of material from a wet mix of solids suspended in liquid, a tank having an opening in its lower end, a foraminous wall extending approximately horizontally across said opening with the upper side thereof to contact with and support said mix in the tank with a chamber above the mix and the other side of said foraminous wall exposed to atmospheric pressure, means sealing said tank and said mix therein against the atmosphere except through said foraminous wall, means for suppling to said chamber above the upper surface of said mix gas pressure substantially in excess of atmospheric pressure and the static head of said mix to force said mix against said foraminous wall thereby to cause liquid to flow from said mix through said wall and deposite solid particles in a layer on the first-mentioned side of said wall, a second pressure chamber having an opening in its lower end, means for moving said foraminous wall with its said deposited layer out of contact with said mix and across said opening in the second pressure chamber, means sealing said second pressure chamber against the atmosphere except through said deposited layer and said wall, and means for supplying gas under high pressure to said second pressure chamber and through said layer for forcing liquid from said layer.

2. A machine as defined in claim 1 with the addition of a rolling means in said second pressure chamber between which and said foraminous wall passes said deposited layer, and means for pressing said rolling means into contact with said layer for squeezing said layer to force liquid therefrom.

3. A machine as defined in claim 1 wherein said foraminous wall comprises a plurality of sections hingedly connected into an endless conveyor and formed to endwise abut each other in a horizontal plane in the upper reach of the belt, sprockets mounting said belt with said upper reach movable across said openings in said tanks, shoes on said sections along the longitudinal edges of said belt, and fixed guide rails cooperating with said shoes to support and guide said sections in said upper reach of the conveyor.

4. A machine as defined in claim 3 wherein said openings in the tank and in said second pressure chamber are rectangular, said foraminous wall is elongate, said openings are spaced apart longitudinally of said wall, said conveyor has its longitudinal edges parallel to two opposite sides of each of said openings and said sealing means includes an upstanding projection on and extending along each longitudinal margin of said foraminous wall providing a smooth upwardly facing surface and a vertical shoulder facing into the tank and pressure chamber, a roller at each of the other sides of each of said openings outside said tanks to rollably contact with the deposited layer on said wall and having its end surfaces in fluid tight engagement with the corresponding said shoulders, and a resilient sealing element having a fluid-tight connection with the walls of said tank and in frictional relatively slidable engagement with said smooth surfaces of said projections and with said end surfaces and the periphery of each of said rollers, and means yieldingly urging said rollers toward said foraminous wall.

5. A machine as defined in claim 1 wherein said foraminous wall comprises a plurality of sections hingedly connected into an endless conveyor and formed to endwise abut each other in a horizontal plane in the upper reach of the belt, sprockets mounting said belt with said upper reach movable across said openings in said tanks, shoes on said sections along the longitudinal edges of said belt, and fixed guide rails cooperating with said shoes to support and guide said sections in said upper reach of the belt, said upstanding projection is sectional with sections on the respective sections of said belt to abut each other endwise in the upper reach of the belt, and with the addition of means sealing the joints between abutting ends of said sections of the upstanding projection.

6. A machine as defined in claim 1 wherein said openings in the tank and in said second pressure chamber are rectangular, said foraminous wall is elongate, said openings are spaced apart longitudinally of said wall, said wall has its longitudinal edges parallel to two opposite sides of each of said openings and said sealing means includes an upstanding projection on and extending along each longitudinal margin of said foraminous wall providing a smooth upwardly facing surface and a vertical shoulder facing into the tank and pressure chamber, a roller at each of the other sides of each of said openings outside said tank and second pressure chamber to rollably contact with the deposited layer on said wall and having its end surfaces in fluid tight engagement with the corresponding said shoulders, and a resilient sealing element having a fluid-tight connection with the walls of each of said tank and said pressure chamber and in frictional relatively slidable engagement with said smooth surfaces of said projections and with said end surfaces and the periphery of each of said rollers, and means yieldingly urging said rollers toward said foraminous wall.

7. A machine as defined in claim 1 wherein said foraminous wall comprises an endless screen belt and means for mounting it for longitudinal movement with a horizontal upper reach, and the means for supporting and moving said foraminous wall comprises an endless conveyor including a plurality of sections hingedly connected together and formed to endwise abut each other in a horizontal plane in the upper reach of the conveyor beneath and in supporting frictional contact with the upper reach of said screen belt, said sections having perforate portions to drain the liquid from said screen belt, and means for driving said conveyor.

8. A machine for forming a continuous strip of material from a wet mix of solids suspended in liquid comprising an approximately horizontal elongate foraminous wall, a plurality of tanks spaced longitudinally of said foraminous wall and each having an opening in its lower end across which said foraminous wall is longitudinally movable with its upper side facing into said tanks through said openings and with its other side exposed to atmosphere, means for supplying a wet mix to certain of said tanks to cause passage of liquid through said wall and consequent deposit of a layer of solids on the upper side of said wall, means for supplying gas under pressure to at least one of the other tanks, means sealing all of said tanks against the atmposhere except through said foraminous wall, and means for moving said foraminous wall longitudinally beneath said tanks in succession.

9. In a machine for forming a continuous sheet or strip from a wet mix of the order of liquid having solids in suspension, the combination of a pressure chamber, a foraminous wall to support a layer of said wet mix deposited on the upper surface of said wall and movable with the wall, means moving said wall through said chamber, means in said chamber for applying a coating of a fluent surfacing substance upon the exposed surface of the deposited layer of material on said foraminous wall at a zone intermediate the length of the portion of said deposited layer that is disposed within said chamber, means to increase gas pressure within the chamber substantially above atmospheric pressure at the side of said deposited layer opposite said foraminous wall and at opposite sides of said means for applying said coating to first force liquid from the deposited layer and from pores in said layer and then to force the surfacing substance of said coating into said pores of said deposited layer on said wall, and means for maintaining substantially lower gas pressure at the side of said foraminous wall opposite said deposited layer.

10. A machine for forming a continuous strip of material from a wet mix of solids suspended in liquid, a tank having an opening in its lower end with its edges in a common approximately flat plane, an approximately flat elongate foraminous wall extending across said opening with the upper side thereof to contact with and support said mix in the tank with a chamber above the mix and with the other side of said foraminous wall exposed to atmospheric pressure, means sealing said tank and said mix therein against the atmosphere except through said foraminous wall, means for supplying to said chamber above the upper surface of said mix gas pressure substantially in excess of atmospheric pressure and the static head of said mix to force said mix against said foraminous wall thereby to cause liquid to flow from said mix through said wall and deposit solid particles in a layer on the first-mentioned side of said wall, and means for moving said foraminous wall across said opening from one side to the opposite side thereof.

11. A machine as defined in claim 10 wherein said foraminous wall is inclined and has a lower portion adjacent the first-mentioned side of said opening in contact with said mix and has an upper portion adjacent the second-mentioned side of said opening above the level of said mix.

12. A machine as defined in claim 1 wherein said openings in the tank and in said second pressure chamber are polygonal, said foraminous wall is elongate, said openings are spaced apart longitudinally of said wall, said wall has its longitudinal edges parallel to two opposite sides of each of said openings and said sealing means includes an upstanding projection on and extending along each longitudinal margin of said foraminous wall providing a smooth upwardly facing surface, sealing apparatus for the edges of said opening including a sealing element having a fluid-tight connection with the walls of each of said tank and said second pressure chamber and having portions in relatively slidable fluid-tight engagement with said smooth surfaces of said projections, a roller at each of the other sides of each of said openings outside said tank and said second pressure chamber having smooth peripheral surfaces to rollably contact with the deposited layer on said wall and also having end surfaces, each sealing element having other portions extending longitudinally of the corresponding rollers in fluid-tight contact with said peripheral surfaces, and said sealing elements having other portions in continuation of the last mentioned portions and in fluid-tight contact with the end surfaces of said rollers, said sealing apparatus also including means to seal the space between the end surfaces of said rollers and the corresponding edges of said deposited layer.

References Cited in the file of this patent

UNITED STATES PATENTS

| | | |
|---|---|---|
| Re.21,201 | Qviller | Sept. 5, 1939 |
| 1,870,971 | Sundstrom et al. | Aug. 9, 1932 |
| 2,422,344 | Easterberg et al. | June 17, 1947 |
| 2,581,210 | Simpson | Jan. 1, 1952 |